United States Patent
Tamura (10) Patent No.: US 9,783,198 B2
(45) Date of Patent: Oct. 10, 2017

(54) VEHICLE TRAVEL CONTROL DEVICE

(71) Applicant: FUJI JUKOGYO KABUSHIKI KAISHA, Tokyo (JP)

(72) Inventor: Yuichiroh Tamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/241,487

(22) Filed: Aug. 19, 2016

(65) Prior Publication Data

US 2017/0057508 A1    Mar. 2, 2017

(30) Foreign Application Priority Data

Aug. 27, 2015 (JP) .................... 2015-168131

(51) Int. Cl.
*B60W 30/165* (2012.01)
*G05D 1/02* (2006.01)

(52) U.S. Cl.
CPC .......... *B60W 30/165* (2013.01); *G05D 1/0231* (2013.01); *B60W 2420/42* (2013.01); *B60W 2550/10* (2013.01); *B60W 2750/306* (2013.01); *B60W 2750/308* (2013.01)

(58) Field of Classification Search
CPC .......... B60W 30/165; B60W 2420/42; B60W 2750/308; B60W 2750/306; G05D 1/0231
USPC .......................................... 701/96
See application file for complete search history.

(56) References Cited

U.S. PATENT DOCUMENTS

| | | | | |
|---|---|---|---|---|
| 8,311,729 B2* | 11/2012 | Saito | .................... | B62D 15/025 701/117 |
| 2001/0037165 A1* | 11/2001 | Shirai | .................... | B60W 30/16 701/1 |
| 2002/0107637 A1* | 8/2002 | Okamura | ................ | G01S 7/412 701/301 |
| 2003/0069695 A1* | 4/2003 | Imanishi | .................. | B60R 1/00 701/301 |
| 2007/0241870 A1* | 10/2007 | Ohmura | .................. | G01S 7/412 340/435 |

(Continued)

FOREIGN PATENT DOCUMENTS

| | | |
|---|---|---|
| JP | 2004-322916 A | 11/2004 |
| JP | 2005-313780 | 11/2005 |

(Continued)

*Primary Examiner* — Atul Trivedi
(74) *Attorney, Agent, or Firm* — Smith, Gambrell & Russell, LLP (57) ABSTRACT

A vehicle travel control device controls a following travel to a vehicle traveling in front of a subject vehicle. In the device, a preceding vehicle registration unit that determines whether a vehicle in front of the subject vehicle should be taken into consideration in a following travel control, and, if so, registers it as a preceding vehicle. A preceding vehicle width calculation unit calculates a vehicle width of the preceding vehicle, and stores the vehicle width of the preceding vehicle as a reference width. A control target point setting unit determines a center position of the preceding vehicle in a vehicle width direction as a control target point of the following travel, and estimates the center position based on the reference width so as to set the estimated center position as the control target point in a case where a part of the preceding vehicle being not detected.

9 Claims, 4 Drawing Sheets

(56) References Cited

U.S. PATENT DOCUMENTS

| | | | | |
|---|---|---|---|---|
| 2008/0136612 A1* | 6/2008 | Machii | ............... | G01S 11/12 |
| | | | | 340/435 |
| 2012/0072050 A1* | 3/2012 | Naka | ............... | B60W 30/09 |
| | | | | 701/1 |
| 2012/0313806 A1* | 12/2012 | Katoh | ............... | G01S 13/931 |
| | | | | 342/52 |
| 2014/0341432 A1* | 11/2014 | Ichida | ............... | G08G 1/165 |
| | | | | 382/103 |
| 2015/0151725 A1* | 6/2015 | Clarke | ............... | B60W 30/00 |
| | | | | 701/28 |
| 2015/0197249 A1* | 7/2015 | Sakima | ............... | B60W 30/165 |
| | | | | 701/96 |
| 2015/0210312 A1* | 7/2015 | Stein | ............... | B60W 30/00 |
| | | | | 701/41 |

FOREIGN PATENT DOCUMENTS

| | | |
|---|---|---|
| JP | 2011-065219 | 3/2011 |
| JP | 2012-201133 | 10/2012 |

* cited by examiner

VEHICLE TRAVEL CONTROL DEVICE

CROSS-REFERENCE TO RELATED APPLICATIONS

The present application claims priority from Japanese Patent Application No. 2015-168131 filed on Aug. 27, 2015, the entire contents of which are hereby incorporated by reference.

BACKGROUND

1. Technical Field

The present invention relates to a vehicle travel control device that controls a following travel to a vehicle traveling in front of a subject vehicle.

2. Related Art

Up to now, in vehicles such as automobiles, as disclosed in Japanese Unexamined Patent Application Publication No. 2004-322916, a following travel system for following-traveling a preceding vehicle that travels in front of a subject vehicle has been known. In the following travel system to the preceding vehicle, the preceding vehicle is captured by a radar or a camera to automatically control steering, a transmission, an engine and a brake of the subject vehicle. This sort of the following travel system has advantages in cases such as traveling on a road without any lane marker and any lane line on a road surface, and an inter-vehicle distance between the subject vehicle and the preceding vehicle being decreased during traveling at a low speed such as a traffic congestion to limit a forward field of view, thereby making it difficult to recognize the lane lines.

In the following travel system described above, generally, a rear area of the preceding vehicle is observed to calculate a travel locus, and a center position of the subject vehicle in a vehicle width direction is controlled to coincide with the calculated travel locus. However, when another vehicle cuts in between the subject vehicle and the preceding vehicle, the rear area of the preceding vehicle which can be detected from the subject vehicle is reduced, resulting in a possibility that the center position of the preceding vehicle in the vehicle width direction is recognized with an offset from an original position. As a result, the subject vehicle may travel following the preceding vehicle with a deviation from the preceding vehicle by the amount of offset recognition.

SUMMARY OF THE INVENTION

It is desirable to provide a vehicle travel control device that is capable of preventing a subject vehicle from following-traveling a preceding vehicle with a deviation even when another vehicle cuts in between the subject vehicle and the preceding vehicle to limit an observation field of view to a rear area of the preceding vehicle while following-traveling the preceding vehicle.

An aspect of the present invention provides a vehicle travel control device that controls a following travel to a vehicle traveling in front of a subject vehicle that is equipped with the vehicle travel control device. The device includes: a preceding vehicle registration unit that determines whether a vehicle present in front of the subject vehicle should be taken into consideration in a following travel control, or not, and registers the vehicle to be determined to be taken into consideration in the following travel control as a preceding vehicle; and a preceding vehicle width calculation unit that calculates a vehicle width of the preceding vehicle based on a rear area of the preceding vehicle, and stores information of the vehicle width of the preceding vehicle under a condition of any obstacle being not identified between the preceding vehicle and the subject vehicle as a reference width. Further, the vehicle travel control device includes a control target point setting unit that determines a center position of the preceding vehicle in a vehicle width direction for setting the center position as a control target point of the following travel, and that estimates the center position of the preceding vehicle in the vehicle width direction based on the reference width stored in the preceding vehicle width calculation unit so as to set the estimated center position as the control target point in a case where a part of the rear area of the preceding vehicle being not detected.

DETAILED DESCRIPTION

Figure 1:
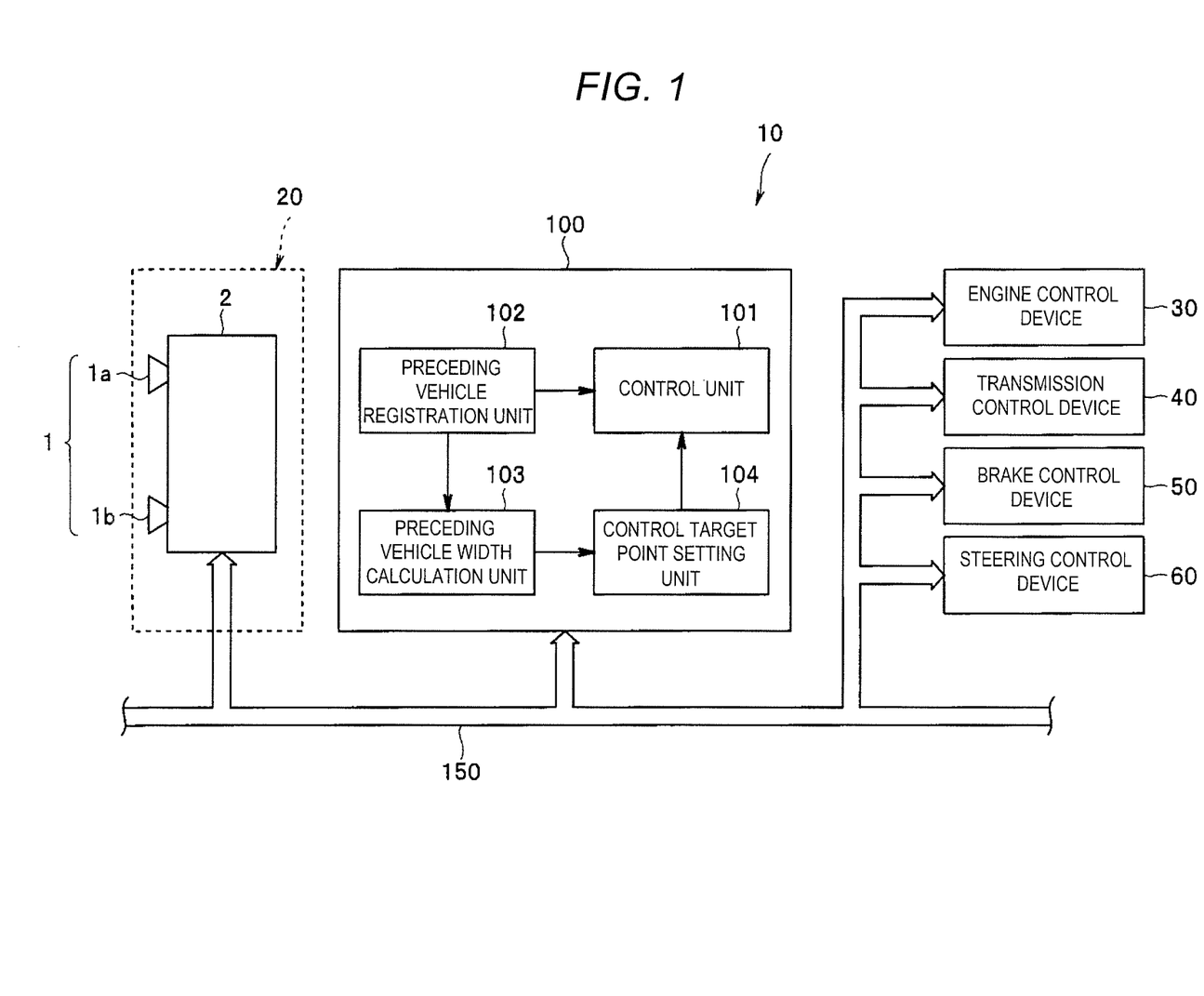
FIG. 1 is a configuration diagram of a travel control system.

Hereinafter, an example of the present invention will be described with reference to the accompanying drawings. Referring to FIG. 1, a travel control system 10 for a vehicle such as an automobile executes a travel control including autonomous automatic operation of the vehicle. The travel control system 10 is configured by a travel control device 100 as a main component, a travel environment recognition device 20, an engine control device 30, a transmission control device 40, a brake control device 50, a steering control device 60 and the like, mutually coupled to one another through a communication bus 150 providing an in-vehicle network.

The travel environment recognition device 20 includes various devices such as an onboard camera, a millimeter-wave radar, or a laser radar that detect an external environment around a subject vehicle, a traffic information communication device that acquires traffic environment information by an infrastructure communication such as a road-to-vehicle communication or a vehicle-to-vehicle communication, and a navigation device that measures a subject vehicle position, matches the measured position to map data, and provides a driver with a travel route guide or traffic information. In this example, as the travel environment recognition device 20, the recognition of the travel environment by an onboard camera 1 and an image recognition device 2 will be mainly described.

In the example, the camera 1 is configured by a stereo camera including two cameras 1*a* and 1*b* that image the same object from different viewpoints, and that are shutter synchronization cameras each having an imaging device such as a CCD or a CMOS. Those cameras 1*a* and 1*b* are disposed, for example, in a predetermined base line length in the vicinity of a rear-view mirror inside of a front window in an upper portion of a vehicle interior.

A pair of right and left images captured by the camera 1 is processed by the image recognition device 2. The image recognition device 2 obtains a pixel deviation amount (parallax) of corresponding positions of the right and left images through a stereo matching processing, and converts the pixel deviation amount into luminance data to generate a distance image. A point on the distance image is coordinate-converted into a point on a real space with a vehicle width direction, that is, a lateral direction of the subject vehicle as an X-axis, a vehicle height direction as a Y-axis, and a vehicle longitudinal direction, that is, a distance direction as a Z-axis. Lane lines on a road, an obstacle, and a vehicle traveling in front of the subject vehicle are three-dimensionally recognized.

The engine control device 30 controls an operating state of an engine (not illustrated) based on signals from various sensors that detect the engine operating state, and various control information transmitted through the communication bus 150. The engine control device 30 executes an engine control mainly including a fuel injection control, an ignition timing control, an opening control of an electronic control throttle valve based on, for example, an intake air amount, a throttle position, an engine coolant temperature, an intake air temperature, an air-fuel ratio, a crank angle, an accelerator position, and other vehicle information.

The transmission control device 40 controls a hydraulic pressure to be supplied to an automatic transmission (not illustrated) based on signals from sensors that detect a shift position or a vehicle speed and various control information transmitted through the communication bus 150, and controls the automatic transmission according to a predetermined transmission gear characteristic.

The brake control device 50 controls four-wheel brake devices (not illustrated) based on, for example, a brake switch, wheel speeds of four wheels, a steering wheel angle, a yaw rate, and other vehicle information, independent of driver's braking operation. The brake control device 50 calculates a brake hydraulic pressure of each wheel based on a braking force of each wheel, and performs an antilock brake system or a side slip prevention control.

The steering control device 60 controls an assist torque produced by an electric power steering motor (not illustrated) installed in a steering system of the vehicle based on, for example, the vehicle speed, the driver's steering torque, the steering wheel angle, the yaw rate, and the other vehicle information. Further, the steering control device 60 controls the driving of the electric power steering motor by a steering amount for following a travel locus of the preceding vehicle when following-traveling the preceding vehicle that travels in front of the subject vehicle according to an instruction from the travel control device 100.

Subsequently, the travel control device 100 that is a main component of the travel control system 10 will be described. The travel control device 100 executes a travel control to a traveling path along a traveling lane of the subject vehicle, and a following travel control to the preceding vehicle, based on the travel environment recognized by the travel environment recognition device 20. Those travel controls are executed by a control unit 101 that is a main portion of the travel control device 100.

Specifically, when the preceding vehicle is not captured ahead of the vehicle, the control unit 101 recognizes the lane lines of the road to detect the driving lane of the subject vehicle, and sets the traveling path along the traveling lane. The control unit 101 executes the travel control through the engine control device 30, the transmission control device 40, the brake control device 50, and the steering control device 60 so as to travel on the traveling path at a set vehicle speed.

Meanwhile, when a forward field of view is limited by the preceding vehicle, for example, in a traffic congestion, and the lane lines of the road cannot be recognized although the preceding vehicle is captured in front of the subject vehicle, the control unit 101 calculates the travel locus of the preceding vehicle. The control unit 101 performs the steering control through the steering control device 60 so as to match the travel locus, and also executes the following travel control to the preceding vehicle through the engine control device 30, the transmission control device 40, and the brake control device 50.

The travel locus of the preceding vehicle is calculated by obtaining candidate points of a position of the preceding vehicle for each frame based on the movement amount of the subject vehicle per each frame of the image captured by the camera 1, and setting a curve approximating a point group of the candidate points as the travel locus of the preceding vehicle. The position of the preceding vehicle is obtained by obtaining the center position of the rear area of the preceding vehicle from the image captured by the camera 1, and setting the center position as the candidate points indicative of the position of the preceding vehicle.

Figure 2:
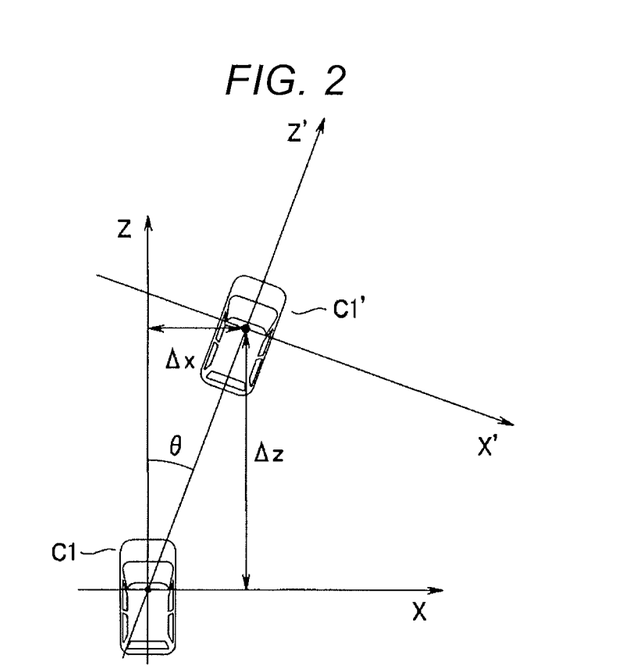
FIG. 2 is an illustrative view of a vehicle movement amount.

Specifically, movement amounts $\Delta x$ and $\Delta z$ to a subject vehicle C1' at a frame rate $\Delta t$ (time required until one frame of the captured image is updated) are calculated on the basis of a vehicle speed V of a subject vehicle C1 and a yaw angle $\theta$ obtained from a yaw rate of the subject vehicle C1 through the following Expressions (1) and (2) according to a relationship illustrated in FIG. 2.

$$\Delta x = V^* \Delta t^* \sin \theta \tag{1}$$

$$\Delta z = V^* \Delta t^* \cos \theta \tag{2}$$

Then, as represented by the following Expressions (3) and (4), after the movement amounts $\Delta x$ and $\Delta z$ of the subject vehicle are subtracted from a candidate point Pold (Xold, Yold) of the preceding vehicle detected in or before a previous frame, a coordinated conversion into a vehicle fixed coordinate system (X', Z') in a present frame is performed to calculate coordinates of a candidate point Ppre (Xpre, Ypre) of the preceding vehicle in the present frame.

$$X\text{pre} = (X\text{old}^* \Delta x)^* \cos \theta - (Z\text{old}^* \Delta z)^* \sin \theta \tag{3}$$

$$Z\text{pre} = (Z\text{old}^* \Delta x)^* \sin \theta + (Z\text{old}^* \Delta z)^* \cos \theta \tag{4}$$

Figure 3:
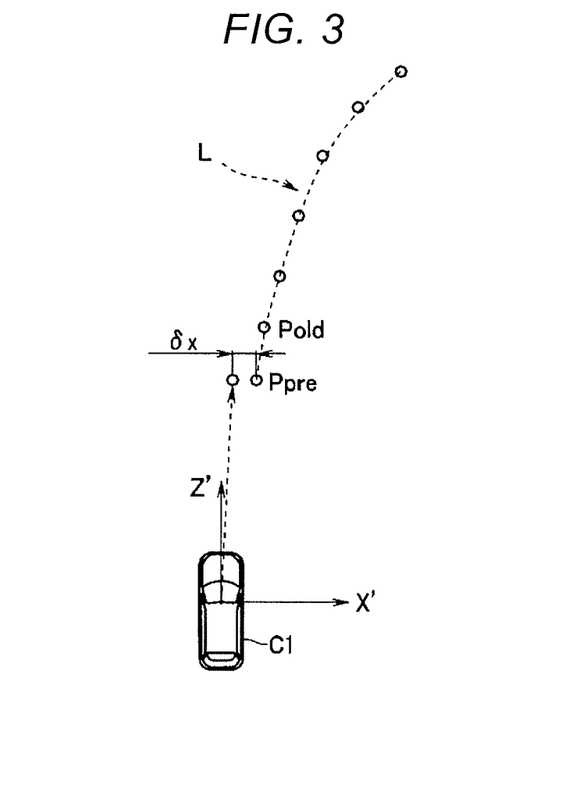
FIG. 3 is an illustrative view illustrating a travel locus of a preceding vehicle.

For example, the least square method is applied to the point group of those candidate points to obtain a curve represented by the following Expression (5), and the curve is set as a travel locus L of the preceding vehicle (refer to FIG. 3). In Expression (5), a coefficient K1 indicates a curvature component of the travel locus, a coefficient K2 indicates a yaw angle component (a slope component of the travel locus to the subject vehicle) of the travel locus, and a coefficient K3 indicates a horizontal position component of the travel locus to the subject vehicle.

$$L = K1^* Z2 + K2^* Z + K3 \tag{5}$$

Figure 4:
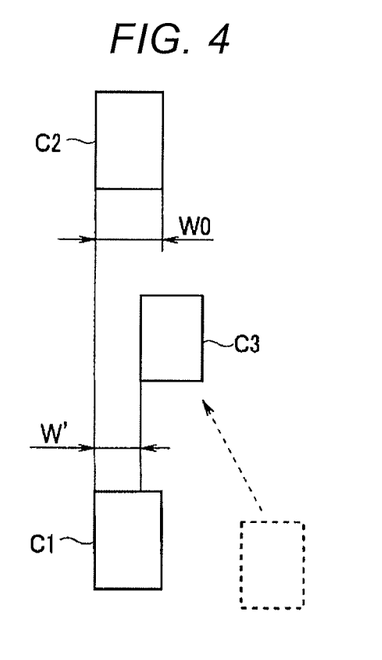
FIG. 4 is an illustrative view illustrating a positional relationship between the preceding vehicle and a cut-in vehicle.

The control for following the travel locus of the preceding vehicle corrects the steering angle of the subject vehicle with the center position of the rear area of the preceding vehicle in the vehicle width direction as a target point, and determines the traveling direction of the subject vehicle. For that reason, when another vehicle (cut-in vehicle) cuts in between the preceding vehicle and the subject vehicle, as illustrated in FIG. 4, a rear area of a preceding vehicle C2 which can be observed from a subject vehicle C1 is covered with a cut-in vehicle C3, and a vehicle width W' of the preceding vehicle C2 which can be actually observed from the subject vehicle C1 becomes smaller than an original vehicle width (reference width W0) of the preceding vehicle. As a result, the center position of the rear area of the preceding vehicle may be offset with respect to an original center position, and the subject vehicle may travel with a deviation by the offset amount.

To prevent travel deviation of the subject vehicle due to appearance of the cut-in vehicle, as illustrated in FIG. 1, the travel control device 100 includes a preceding vehicle registration unit 102, a preceding vehicle width calculation unit 103, and a control target point setting unit 104 in addition to the control unit 101 that is a main functional portion.

When another vehicle is recognized within a set area in front of the subject vehicle from the image captured by the camera 1, the preceding vehicle registration unit 102 determines whether the recognized vehicle is a preceding vehicle to be captured as a following travel target, or not, according to a relative position or a relative speed between the recognized vehicle and the subject vehicle. When the recognized vehicle is determined as the following travel target, the preceding vehicle registration unit 102 registers the recognized vehicle as the preceding vehicle, and transmits information on the registered vehicle to the control unit 101, the preceding vehicle width calculation unit 103, and the control target point setting unit 104.

Further, the preceding vehicle registration unit 102 monitors a cutting-in state of the cut-in vehicle based on the present vehicle width W of the preceding vehicle which is calculated by the preceding vehicle width calculation unit 103 to be described below, and the reference width W0, during the following travel to the preceding vehicle. When it is determined that the cutting-in of the cut-in vehicle is completed, the preceding vehicle registration unit 102 changes a steering control target of the following travel from the present preceding vehicle to the cut-in vehicle, and changes the registered vehicle as the preceding vehicle from the present preceding vehicle to the cut-in vehicle.

Whether the cutting-in of the cut-in vehicle is completed, or not, is determined according to whether the vehicle width W calculated from the rear area of the preceding vehicle deviates from the stored reference width W0 by a set value or more, or not. Specifically, when a difference ΔW between the reference width W0 of the preceding vehicle and the vehicle width W actually detected, or an overlap ratio RL (ratio of an overlapping portion of the cut-in vehicle with the reference width W0 of the preceding vehicle in the vehicle width direction) between the preceding vehicle and the cut-in vehicle becomes larger than each threshold, it is determined that the vehicle width W calculated from the rear area of the preceding vehicle deviates from the stored reference width W0 by the set value or more (the cutting-in of the cut-in vehicle is completed), the preceding vehicle is replaced with the cut-in vehicle.

The preceding vehicle width calculation unit 103 calculates a difference between a right end position and a left end position of the rear area of the preceding vehicle registered by the preceding vehicle registration unit 102 in an X-axis direction as the vehicle width W of the preceding vehicle, and stores the reference width W0 of the preceding vehicle. As the reference width W0, for example, a time mean value of difference data when any obstacle is not identified between the preceding vehicle and the subject vehicle in past is obtained, and is stored in a memory of the device as the vehicle width of the registered preceding vehicle. The reference width W0 stored in the memory is updated every time the preceding vehicle is registered.

The control target point setting unit 104 obtains the center position of the preceding vehicle in the vehicle width direction based on the vehicle width W of the preceding vehicle which is calculated by the preceding vehicle width calculation unit 103, sets the obtained center position as a target point of the steering control during the following travel, and transmits the target point to the control unit 101. The control unit 101 corrects the present steering angle through the steering control device 60 so that the center position of the subject vehicle in the vehicle width direction matches the control target point, and controls the following travel to the preceding vehicle.

The steering control for the control target point is mainly executed by a feedback control based on a deviation Δx between the subject vehicle position when traveling at the present steering angle and the control target point. For example, as represented by the following Expression (6), a feedforward amount based on the curvature K1 of the travel locus of the preceding vehicle and a feedback amount of a deviation δyaw for allowing the yaw angle of the subject vehicle to match the yaw angle component K2 of the travel locus added to a steering amount based on the deviation δx from the control target point to calculate a target steering angle αref, and the driving of the electric power steering motor is controlled by a target steering torque for realizing the target steering angle αref.

$$\alpha\text{ref} = Gl^*\delta x + Gff^*K1 + Gy^*\delta\text{yaw} \tag{6}$$

where Gl is a feedback gain to a deviation between the subject vehicle position and the control target point when traveling at the present steering angle, Gff is a feedforward gain to the curvature of the travel locus, and Gy is a feedback gain to a relative yaw angle between the travel locus and the subject vehicle.

Further, when another vehicle cuts in between the preceding vehicle and the subject vehicle during the following travel, and one end of the rear area of the preceding vehicle is no longer visible by the cut-in vehicle, the reference width W0 of the preceding vehicle calculated and stored by the preceding vehicle width calculation unit 103 is applied to the visible other end side to estimate an invisible area blocked by the cut-in vehicle. Coordinates of an original center position of the rear area of the preceding vehicle are estimated from coordinates of the visible other end side and the reference width W0, and set as the control target point. As a result, even when a part of the rear area of the preceding vehicle cannot be detected, the subject vehicle is prevented from traveling while deviating from the preceding vehicle.

In this case, as described above, when a size of the area hidden by the cut-in vehicle in the rear area of the preceding vehicle exceeds a predetermined size, the registration as the preceding vehicle is changed from the present preceding vehicle to the cut-in vehicle assuming that the cutting-in is completed, and the control target point is set according to the vehicle width of the cut-in vehicle. Then, the control unit 101 instructs the steering control device 60 to correct the steering so that the center position of the subject vehicle in the vehicle width direction matches the center position of the new preceding vehicle (cut-in vehicle) in the vehicle width direction.

Figure 5:
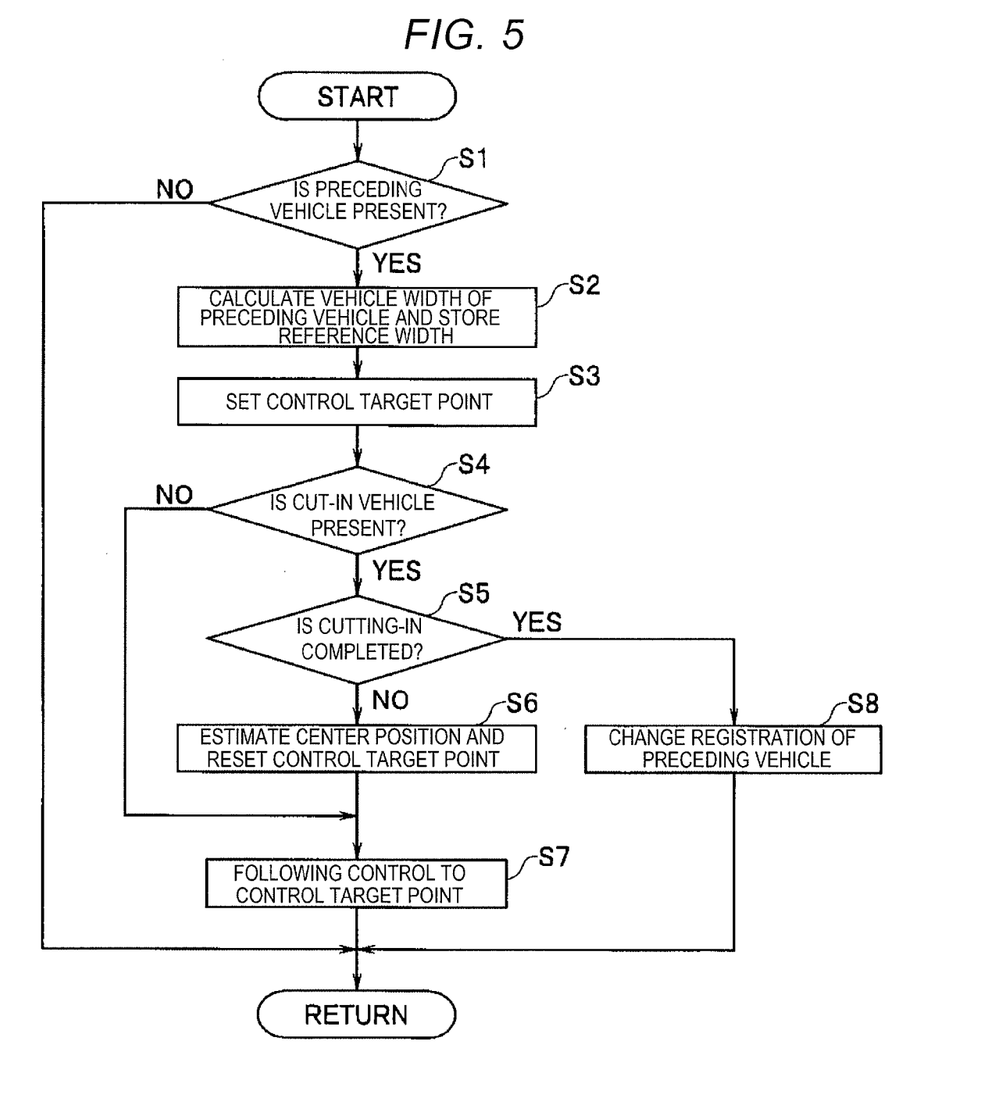
FIG. 5 is a flowchart of a following travel control.

Then, program processing of the following travel control to the preceding vehicle in the travel control device 100 will be described with reference to a flowchart of FIG. 5.

In the following travel control to the preceding vehicle, in first Step S1, it is checked whether any vehicle captured within a predetermined area in front of the subject vehicle and registered as the preceding vehicle is identified, or not. Then, if the vehicle registered as the preceding vehicle is not identified, the process exits this processing, and if the vehicle registered as the preceding vehicle is identified, the process proceeds to Step S2, the vehicle width W of the preceding vehicle is calculated, and the vehicle width W under a condition of any obstacle being not identified between the subject vehicle and the preceding vehicle is stored as the reference width W0.

Then, the process proceeds to Step S3, the center position in the vehicle width direction is obtained from the vehicle width W of the preceding vehicle, and the center position of the preceding vehicle is set as the control target point during the following travel. Then, it is checked whether the cut-in vehicle that cuts in between the subject vehicle and the preceding vehicle is identified, or not, in Step S4, and if the cut-in vehicle is not identified, the process proceeds to Step S7, and the following travel control including the steering control is executed so that the center position of the subject vehicle matches the control target point.

On the other hand, if the cut-in vehicle is identified between the subject vehicle and the preceding vehicle in Step S4, the process proceeds to Step S5 from Step S4, and it is checked whether the cutting-in is completed, or not, according to a change in the rear area of the preceding vehicle covered with the cut-in vehicle. Specifically, as described above, it is determined whether the cutting-in is completed, or not, according to the difference ΔW between the reference width W0 of the preceding vehicle and the vehicle width W actually detected, or the overlap ratio RL between the preceding vehicle and the cut-in vehicle becomes larger than each threshold, or not.

If it is determined that the cutting-in of the cut-in vehicle is not completed in Step S5, the process proceeds to Step S6 from Step S5, and the coordinates of the original center position of the rear area of the preceding vehicle are obtained on the basis of coordinates on an end side that is not covered with the cut-in vehicle in the rear area of the preceding vehicle, and the stored reference width W0 of the preceding vehicle, and are reset as the control target point. Then, the following travel control including the steering control is executed so that the center position of the subject vehicle matches the control target point in Step S7.

On the other hand, if it is determined that the cutting-in of the cut-in vehicle is completed in Step S5, the process proceeds to Step S8 from Step S5, and the cut-in vehicle is newly registered as the preceding vehicle that is a following travel target. Then, the following travel control to the new preceding vehicle is executed through the vehicle width calculation of the preceding vehicle (Step 2) and the setting of the control target point (Step S3) described above.

As has been described above, in the present example, even when another vehicle cuts in between the subject vehicle and the preceding vehicle to limit the observation field of view to the rear area of the preceding vehicle during the following travel in which the center position of the rear area of the preceding vehicle in the vehicle width direction is set as the control target point, the center position of the preceding vehicle in the vehicle width direction is estimated on the basis of the stored reference width of the preceding vehicle to reset the control target point. As a result, the subject vehicle can be prevented from traveling while deviating from the preceding vehicle.

The invention claimed is:

1. A vehicle travel control device that controls a following travel to a vehicle traveling in front of a subject vehicle that is equipped with the vehicle travel control device, the device comprising:
   a preceding vehicle registration unit that determines whether a vehicle present in front of the subject vehicle should be taken into consideration in a following travel control, or not, and registers the vehicle to be determined to be taken into consideration in the following travel control as a preceding vehicle;
   a preceding vehicle width calculation unit that calculates a vehicle width of the preceding vehicle based on a rear area of the preceding vehicle, and stores information of the vehicle width of the preceding vehicle under a condition of any obstacle being not identified between the preceding vehicle and the subject vehicle as a reference width; and
   a control target point setting unit that determines a center position of the rear area of the preceding vehicle in a vehicle width direction for setting the center position as a control target point of the following travel, and that estimates the center position of the rear area of the preceding vehicle in the vehicle width direction based on the reference width stored in the preceding vehicle width calculation unit so as to set the estimated center position as the control target point in a case where a part of the rear area of the preceding vehicle being not detected.

2. The vehicle travel control device according to claim 1, wherein when one end side of the rear area of the preceding vehicle in the vehicle width direction cannot be detected, the control target point setting unit applies the reference width to the detected other end side.

3. The vehicle travel control device according to claim 2, wherein the control target point setting unit stores a time mean value of the vehicle width of the preceding vehicle under the condition of any obstacle being not identified between the preceding vehicle and the subject vehicle as the reference width.

4. The vehicle travel control device according to claim 3, wherein when the vehicle width calculated from the rear area of the preceding vehicle deviates from the reference width by a set value or more due to another vehicle cutting in between the preceding vehicle and the subject vehicle, the preceding vehicle registration unit determines that the cutting-in of the another vehicle is completed, and changes the registration of the vehicle to be taken into consideration in the following travel control from the present preceding vehicle to the another vehicle.

5. The vehicle travel control device according to claim 2, wherein when the vehicle width calculated from the rear area of the preceding vehicle deviates from the reference width by a set value or more due to another vehicle cutting in between the preceding vehicle and the subject vehicle, the preceding vehicle registration unit determines that the cutting-in of the another vehicle is completed, and changes the registration of the vehicle to be taken into consideration in the following travel control from the present preceding vehicle to the another vehicle.

6. The vehicle travel control device according to claim 1, wherein the control target point setting unit stores a time mean value of the vehicle width of the preceding vehicle under the condition of any obstacle being not identified between the preceding vehicle and the subject vehicle as the reference width.

7. The vehicle travel control device according to claim 6, wherein when the vehicle width calculated from the rear area of the preceding vehicle deviates from the reference width by a set value or more due to another vehicle cutting in between the preceding vehicle and the subject vehicle, the preceding vehicle registration unit determines that the cutting-in of the another vehicle is completed, and changes the registration of the vehicle to be taken into consideration in the following travel control from the present preceding vehicle to the another vehicle.

8. The vehicle travel control device according to claim 1, wherein when the vehicle width calculated from the rear area of the preceding vehicle deviates from the reference width by a set value or more due to another vehicle cutting in between the preceding vehicle and the subject vehicle, the preceding vehicle registration unit determines that the cutting-in of the another vehicle is completed, and changes the registration of the vehicle to be taken into consideration in the following travel control from the present preceding vehicle to the another vehicle.

9. A vehicle travel control device that controls a following travel to a vehicle traveling in front of a subject vehicle that is equipped with the vehicle travel control device, the device comprising:

circuitry configured to determine whether a vehicle present in front of the subject vehicle should be taken into consideration in a following travel control, or not, register the vehicle to be determined to be taken into consideration in the following travel control as the preceding vehicle, calculate a vehicle width of the preceding vehicle based on a rear area of the preceding vehicle, store information of the vehicle width of the preceding vehicle under a condition of any obstacle being not identified between the preceding vehicle and the subject vehicle as a reference width, determine a center position of the rear area of the preceding vehicle in a vehicle width direction for setting the center position as a control target point of the following travel, and estimate the center position of the rear area of the preceding vehicle in the vehicle width direction based on the reference width stored in the preceding vehicle width calculation unit so as to set the estimated center position as the control target point in a case where a part of the rear area of the preceding vehicle being not detected.

* * * * *